US006538906B1

(12) United States Patent
Ke et al.

(10) Patent No.: US 6,538,906 B1
(45) Date of Patent: Mar. 25, 2003

(54) ENERGY STORAGE CIRCUIT FOR DC-DC CONVERTER

(75) Inventors: Zhongwei Ke, Taoyuan Shien (TW); Alpha J. Zhang, Taoyuan Shien (TW); Bin Jin, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 10/074,074

(22) Filed: Feb. 11, 2002

(51) Int. Cl.[7] ............................................. H02M 3/335

(52) U.S. Cl. ..................... 363/21.02; 323/288; 363/131

(58) Field of Search ............................... 363/20, 21.01, 363/21.02, 21.04, 21.12, 23–25, 97, 131, 133; 323/288

(56) References Cited

U.S. PATENT DOCUMENTS 4,652,809 A * 3/1987 Barn .......................... 323/282
5,126,931 A * 6/1992 Jitaru .......................... 363/131
6,069,800 A * 5/2000 Cross et al. .................. 363/20

* cited by examiner

*Primary Examiner*—Michael Sherry
*Assistant Examiner*—Gary L. Laxton
(74) *Attorney, Agent, or Firm*—Gazdzinski & Associates

(57) ABSTRACT

An energy storage circuit for a wide input voltage range DC-DC converter with holdup time requirement. The energy storage circuit comprises (1) an energy storage capacitor, (2) a charging path including a diode connected in series with a current limiting resistor coupled in series with the energy storage capacitor, (3) a discharging path including a parallel-coupled switch and a diode coupled in series with a filtering inductor which is coupled in series with the energy storage capacitor, and (4) a logic control unit coupled to the switch for turning the switch of the discharge path on and off.

20 Claims, 3 Drawing Sheets

ENERGY STORAGE CIRCUIT FOR DC-DC CONVERTER

FIELD OF THE INVENTION

This invention relates generally to the power supply systems that performs DC-DC conversion operations and more particularly, this invention relates to an energy storage circuit for a DC-DC converter of a wide input voltage range to operate the converter more efficiently with less capacitor at holdup time requirement applications.

BACKGROUND OF THE INVENTION

It is becoming a demand to design a DC-DC converter for running at wide range of input voltage and for satisfying a holdup time when input voltage disappears. Generally, there are two approaches for designing these converters. One is two-stage approach, and the other is single-stage approach.

The two-stage approach includes a boost stage and a DC-DC stage. The boost stage converts the wide range input voltage to a fixed high voltage with holdup energy stored in high voltage DC bus capacitor, and the DC-DC stage provides DC output with an optimized design. The two-stage approach is known for its good performance such as low input current harmonics, small bulk capacitor for holdup time design, and optimized conversion efficiency. However, due to the additional boost power stage and its additional control circuit, the cost for components is increased, and size and weight are significantly increased. It is undesirable for low-power size-sensitive power supplies.

The single-stage approach is simple in circuit structure due to single DC/DC stage design. However, to satisfy required holdup time, the converter must be designed at minimum input voltage with a large number of input capacitors to store enough energy and a further extended input voltage range. The considerable number of input capacitors increases the overall size and the cost of the converter, and the extended input voltage range increases the rating of semiconductor and the cost of the converter and further lowers the overall conversion efficiency.

SUMMARY OF THE INVENTION

It is an object of the present invention to ensure high conversion efficiency of DC/DC converter for wide range of input voltage operation with holdup time requirement.

It is another object of the present invention to minimize storage capacitor for a given holdup time requirement.

It is a further another object of the present invention to lower the voltage rating and thus to lower the conduction loss of second side rectifier.

To achieve these objectives of the invention and in accordance with the purpose of the present invention, the present invention provides an energy storage circuit for a wide range of input voltage DC-DC converter with holdup time requirement. The energy storage circuit comprises (1) an energy storage capacitor, (2) a charging path including a diode connected in series with a current limiting resistor which is connected in series with the energy storage capacitor, (3) a discharging path including a parallel-coupled switch and a diode connected in series with a filtering inductor, coupled in series with said energy storage capacitor, and (4) a logic control unit coupled to the switch and is capable of turning the switch on and off.

DETAILED DESCRIPTION OF THE PREFERRED EMBODIMENT

Figure 1:
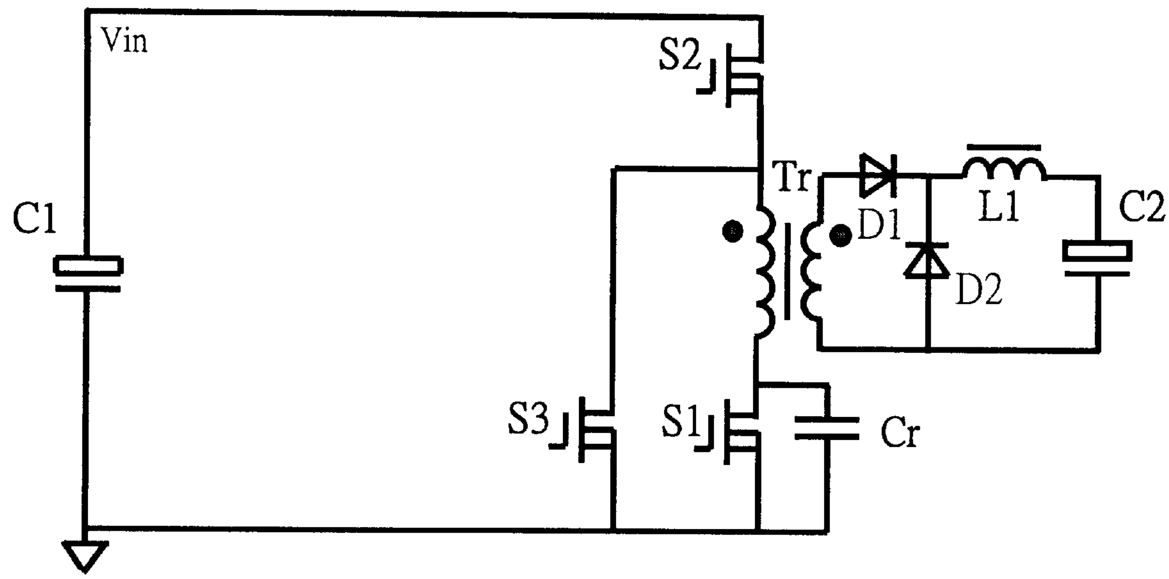
FIG. 1 is a configuration of prior art of a resonant reset dual switch forward DC-DC converter.

FIG. 1 shows the prior configuration of resonant reset dual switch forward DC-DC converter. When the two switches S1 and S2 turn on simultaneously, the primary winding of the transformer Tr is magnetized by input voltage Vin. And when the two switches S1 and S2 turn off simultaneously and switch S3 turns on, the transformer winding is demagnetized reversely by resonant resetting of reset capacitor Cr. Comparing with conventional dual switch forward converter, the resonant reset dual switch forward DC-DC converter can operate with an exceed of 50% duty cycle by a higher reset voltage. That means this converter can achieve high conversion efficiency in a wide range of input voltage operation, such as 36V–72V input voltage application.

If holdup time need is required, the converter shown in FIG. 1 still needs a large number of input capacitors to meet holdup time requirement at minimum input voltage and further extends input voltage range design which will result in lower conversion efficiency and higher cost.

Figure 2:
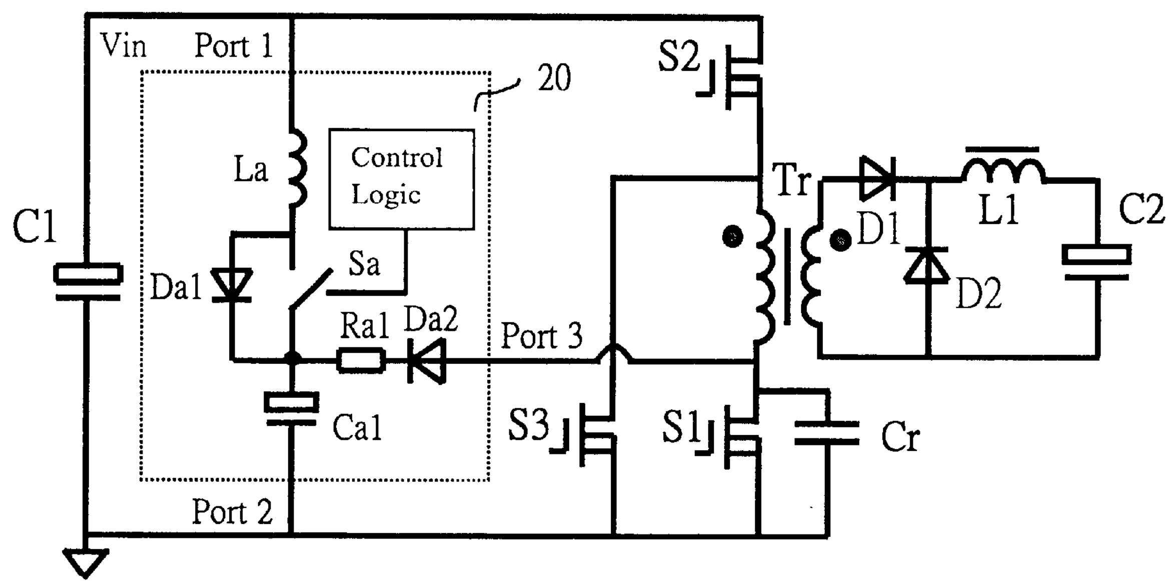
FIG. 2 is a circuit diagram of a particular type of energy storage circuit applied to resonant reset dual switch forward DC-DC converter according to a first preferred embodiment of the present invention.

Referring to FIG. 2, a circuit diagram of a particular type of energy storage circuit applied to resonant reset dual switch forward DC-DC converter according to a first preferred embodiment of the present invention is illustrated. The present invention enables resonant reset dual switch forward DC-DC converter to operate in wide range of input voltage and to satisfy holdup time requirement with small storage capacitor by inserting an energy storage circuit. The energy storage circuit comprises an energy storage capacitor Ca1 with one terminal coupled to ground via port 2; a charging path including a diode Da2 connected in series with a current limiting resistor Ra1 which is coupled in series between reset capacitor Cr of the DC-DC converter as charging source and the energy storage capacitor Ca1 via port 3, and it is capable of providing a path for charging the energy storage capacitor Ca1; a discharging path including a parallel-coupled switch Sa and a diode Da1 connected in series with a filtering inductor La which is coupled in series between the energy storage capacitor Ca1 and a positive terminal of DC voltage bus of the DC-DC converter via port 1, and it is capable of turning the switch Sa off during a holdup mode to allow the energy storage capacitor Ca1 to discharge current to the DC voltage bus; and a logic control unit coupled to the switch Sa, and it is capable of turning the switch Sa on during a normal mode and turning said switch Sa off during holdup mode.

In normal operation mode, the energy storage capacitor Ca1 is charged initially by input DC bus through filtering inductor La and diode Da1. The charging path acts as a current-limiting peak-rectifier to charge storage capacitor Ca1 to a peak voltage of reset capacitor Cr. In normal design, the converter will operate the output filter inductor L1 in a continuous current mode, and the duty cycle will keep constant during the load changing. Especially, when synchronous rectifier is used, the duty cycle will not change from open load to full load. Thus, the magnetizing voltage-second of the transformer Tr also keeps constant for the changing of input voltage and output load, and the peak voltage of reset capacitor Cr will also keep a constant value for the changing of input voltage and output load. Therefore, the energy storage capacitor Ca1 will be charged to a fixed voltage level as that of peak voltage across resonant reset capacitor Cr regardless of the input voltage and output load condition.

When the input voltage fails, control logic unit enters a holdup mode for the converter by turning the switch Sa of the discharging path off. The energy stored in the storage capacitor Ca1 transfers to DC voltage bus through switch Sa and filtering inductor La. The total transferred energy (E) can be expressed:

$$E = \frac{Ca1 \cdot (V_{Ca1}^2 - V_{in\ \min}^2)}{2}$$

Where Ca1 is capacitance of the storage capacitor Ca1, Vca1 is charged voltage of the storage capacitor Ca1, and Vinmin is minimum operation voltage of the converter, normally equal to minimum input voltage.

At normal design, Vca1 is designed to as slightly higher than maximum input voltage, so that all the primary switches, as well as second rectifier, keep same voltage rating respectively. And the design of main stage of the converter is the same as a conventional design without deteriorating the performance of the converter. Therefore with the energy storage circuit, the resonant reset dual switch forward DC-DC converter meets holdup time requirement and high performance without increasing rating of component.

Figure 3:
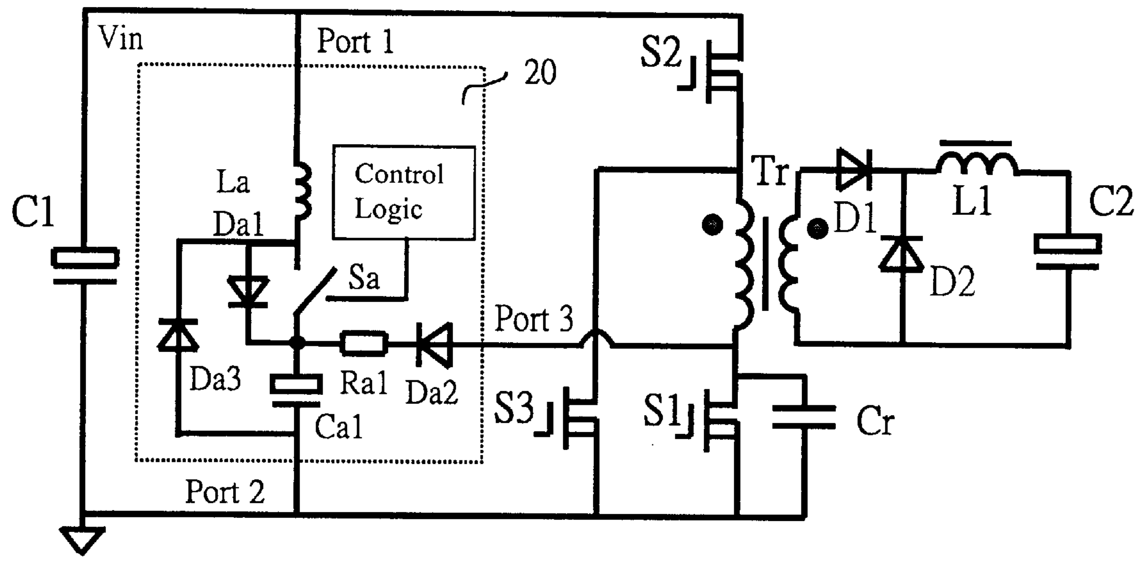
FIG. 3 is a circuit diagram of a particular type of energy storage circuit applied to resonant reset dual switch forward DC-DC converter according to a second preferred embodiment of the present invention.

FIG. 3 shows another configuration of the present invention. As shown in FIG. 3, there is a modification of the discharging path of the energy storage circuit. A diode Da3 is connected between filtering inductor La and the ground. The diode Da3 provides a current path for filtering inductor La when the switch Sa turns off.

Figure 4:
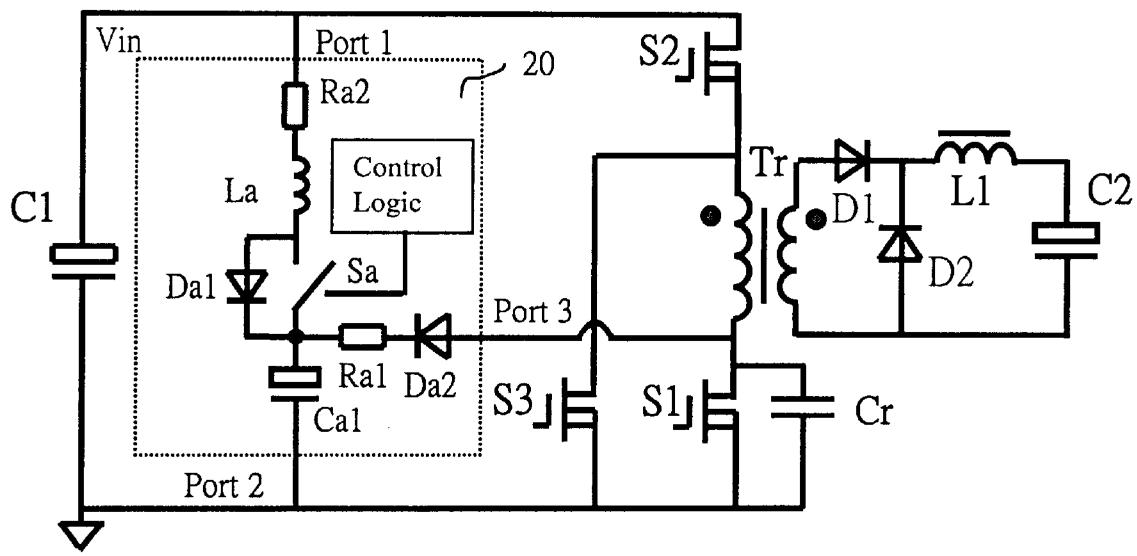
FIG. 4 is a circuit diagram of a particular type of energy storage circuit applied to resonant reset dual switch forward DC-DC converter according to a third preferred embodiment of the present invention.

FIG. 4 shows further another configuration of the present invention. As shown in FIG. 4, there is another modification of the discharging path of the energy storage circuit by connecting a resistor Ra2 in series with filtering inductor La to further limit the initial charging current and discharging current.

Figure 5:
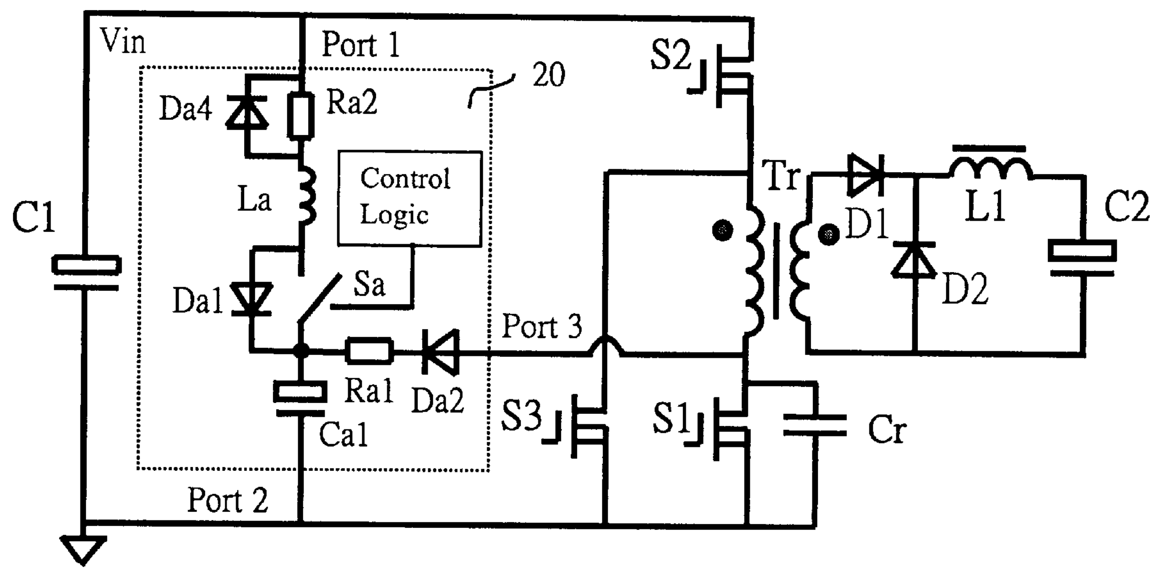
FIG. 5 is a circuit diagram of a particular type of energy storage circuit applied to resonant reset dual switch forward DC-DC converter according to a fourth preferred embodiment of the present invention.

FIG. 5 shows another configuration of the present invention. As shown in FIG. 5, there is another modification of the discharging path of the energy storage circuit by connecting a diode Da4 in parallel with current limiting resistor Ra2 only to limit unidirectional current of initial charging current or discharging current.

Figure 6:
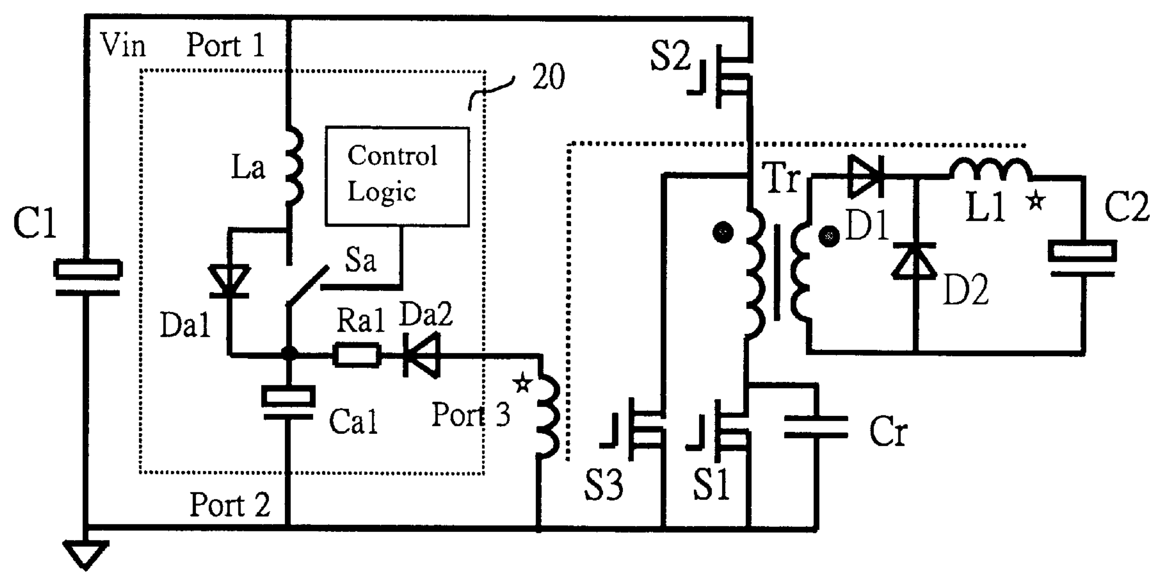
FIG. 6 is a circuit diagram of a particular type of energy storage circuit applied to resonant reset dual switch forward DC-DC converter according to a fifth preferred embodiment of the present invention.

For forward type converter, the output filtering inductor keeps a constant voltage as the same as the output voltage at switching off time. So it is an alternate embodiment of the present invention by connecting coupled winding of output filtering inductor L1 as charging source to charging the energy storage capacitor Ca1, as shown in FIG. 6. The voltage of energy storage capacitor Ca1 keeps constant during changing of input voltage and output load, and is only decided by turn ratio of coupled winding of filter L1 and output voltage. This alternate embodiment also can be used for other type converter with output filtering inductor, such as half bridge DC-DC converter, full bridge DC-DC converter, and buck DC-DC converter.

The energy storage circuit of the present invention is a three-ported cell, which can be used in any type of DC-DC converter to meet holdup time requirement as long as the converter provides a constant charging source, such as flyback converter with third winding of transformer as charging source, boost converter with boost switch voltage as charging source.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. An energy storage circuit for use in a DC-DC converter, comprising:

an energy storage capacitor with one terminal coupled to a ground terminal;

a charging path including a first diode connected in series with a current limiting resistor coupled in series between a node which serves as a charging source and said energy storage capacitor for providing a path for charging said energy storage capacitor;

a discharging path including a parallel-coupled switch and a second diode connected in series with a filtering inductor which is coupled in series between said energy storage capacitor and a positive terminal of a DC voltage bus of said DC-DC converter, wherein said switch is configured to turn off during a holdup mode to allow said energy storage capacitor to discharge a current to said DC voltage bus; and a logic control unit coupled to said switch for turning said switch on and off.

2. The energy storage circuit as recited in claim 1 wherein said parallel-coupled switch is a metal-oxide semiconductor field-effect transistor and said second diode is a body diode of said metal-oxide semiconductor field-effect transistor.

3. The energy storage circuit as recited in claim 1 wherein said discharging path further comprises a freewheeling diode connected between said filtering inductor and said ground potential.

4. The energy storage circuit as recited in claim 1 wherein a current limiting resistor is further connected in series with said filtering inductor.

5. The energy storage circuit as recited in claim 4 wherein a third diode is further connected in parallel with said current limiting resistor.

6. The energy storage circuit as recited in claim 1 wherein said node of said DC-DC converter is connected with an element selected from a group consisting of:

a resonant capacitor;

a couple winding of output filter inductor;

a node of primary winding of transformer;

a third winding of transformer; and a source node of said converter, wherein a peak voltage of the source node keeps approximately constant during the variation of input voltage.

7. A method of extending a holdup time of a DC-DC converter comprising steps of:

providing an energy storage capacitor with one terminal coupled to a ground terminal; providing a charging path, including a first diode connected in series with a current limiting resister coupled in series between one node of said DC-DC converter as a charging source and said energy storage capacitor, for limiting a current to flow from said charging source to said energy storage capacitor and keeping a voltage of said energy storage capacitor equal to a peak voltage of said charging source when said DC-DC converter is in a normal mode; and providing a discharging path, including a parallel-coupled switch and a second diode connected in series with a filtering inductor which is coupled in series between said energy storage capacitor and a positive terminal of a DC voltage bus, wherein said switch is configured to turn off during a holdup mode to allow said energy storage capacitor to discharge current to said DC voltage bus through said discharging path.

8. The method as recited in claim 7 wherein said charging source further can be either an alternating-current voltage, a direct-current voltage, a pulse or a spike voltage and said charging source is selected from a group consisting of:

a resonant capacitor;

a couple winding of output filter inductor;

a node of primary winding of transformer;

a third winding of transformer; and a source node of said converter, wherein a peak voltage of the source node keeps approximately constant during the variation of input voltage.

9. The method as recited in claim 7 wherein said parallel-coupled switch is a metal-oxide semiconductor field-effect transistor and said second diode is a body diode of said metal-oxide semiconductor field-effect transistor.

10. The method as recited in claim 7 wherein said discharging path further comprises a freewheeling diode connected between said filtering inductor and said ground potential.

11. The method as recited in claim 7 wherein a current limiting resistor is further connected in series with said filtering inductor.

12. The method as recited in claim 11 wherein a third diode is further connected in parallel with said current limiting resistor.

13. A DC-DC converter coupled to a DC power source, comprising:

at least one power switch that turns on alternately to transfer energy from said DC power source to a DC output of said converter;

a transformer having a primary winding coupled in series with said power switch;

an energy storage circuit coupled across said DC bus and one node of said converter, comprising:

an energy storage capacitor with one terminal coupled to a ground terminal;

a charging path including a first diode connected in series with a current limiting resistor coupled in series between one node of said DC-DC converter as a charging source and said energy storage capacitor for providing a path for charging a current to flow from said DC-DC converter to said storage capacitor;

a discharging path including a parallel-coupled switch and a second diode connected in series with a filtering inductor which is coupled in series between said energy storage capacitor and a positive terminal of a DC voltage bus, wherein said switch is configured to turn off during a holdup time to allow said energy storage capacitor to discharge a current to said DC voltage bus; and a logic control unit coupled to said switch for turning said switch on and off.

14. The DC-DC converter as recited in claim 13 wherein said DC-DC converter is selected from a group consisting of:

a forward type DC-DC converter;

a flyback DC-DC converter;

a boost DC-DC converter;

a half bridge DC-DC converter;

a full bridge DC-DC converter; and a buck DC-DC converter.

15. The DC-DC converter as recited in claim 13 wherein said DC power source can be either an output of a battery, a power factor corrector or a DC/DC converter.

16. The DC-DC converter as recited in claim 13 wherein said parallel-coupled switch is a metal-oxide semiconductor field-effect transistor and said second diode is a body diode of said metal-oxide semiconductor field-effect transistor.

17. The DC-DC converter as recited in claim 13 wherein said discharging chain further comprises a freewheeling diode connecting between said filtering inductor and said ground terminal.

18. The DC-DC converter as recited in claim 13 wherein a current limiting resistor is further connected in series with said filtering inductor.

19. The DC-DC converter as recited in claim 18 wherein a third diode is further connected in parallel with said current limiting resistor.

20. The DC-DC converter as recited in claim 13 wherein said one node of said DC-DC converter is selected from a group consisting of:

a resonant capacitor;

a couple winding of an output filter inductor;

a node of primary winding of transformer;

a third winding of transformer; and a source node of said converter that a peak voltage of the source node keeps approximately constant during a variety of input voltage.

* * * * *